United States Patent [19]

Kashimura et al.

[11] Patent Number: 6,061,624
[45] Date of Patent: May 9, 2000

[54] MULTI-CYLINDER ENGINE COMBUSTION STATE DIAGNOSIS APPARATUS AND METHOD

[75] Inventors: Yuichi Kashimura; Yutaka Takaku, both of Hitachinaka; Toshio Ishii, Mito, all of Japan

[73] Assignee: Hitachi, Ltd., Tokyo, Japan

[21] Appl. No.: 08/350,119

[22] Filed: Nov. 29, 1994

[30] Foreign Application Priority Data

Nov. 29, 1993 [JP] Japan .................................. 5-297683

[51] Int. Cl.[7] .................................................. G01M 15/00
[52] U.S. Cl. ............................ 701/110; 73/116; 73/117.3
[58] Field of Search ......................... 73/115, 116, 117.2, 73/117.3; 364/431.07, 431.08

[56] References Cited

U.S. PATENT DOCUMENTS

| | | | |
|---|---|---|---|
| 4,898,025 | 2/1990 | Weyland ................................ | 73/117.3 |
| 5,041,980 | 8/1991 | Maddock et al. ........................ | 73/116 |
| 5,044,195 | 9/1991 | James et al. ............................ | 73/117.3 |
| 5,056,360 | 10/1991 | Dosdall et al. .......................... | 73/116 |
| 5,088,318 | 2/1992 | Osawa .................................. | 73/117.3 |
| 5,095,742 | 3/1992 | James et al. ............................ | 73/116 |
| 5,237,862 | 8/1993 | Mangrulkar et al. ..................... | 73/116 |
| 5,245,866 | 9/1993 | Hashiguchi et al. .................... | 73/117.3 |
| 5,258,753 | 11/1993 | Jonker et al. ........................... | 73/117.3 |
| 5,263,364 | 11/1993 | Nakayama et al. ...................... | 73/116 |
| 5,287,736 | 2/1994 | Nakayama et al. ...................... | 73/116 |
| 5,297,047 | 3/1994 | Matsuno ................................ | 73/117.3 |
| 5,307,671 | 5/1994 | Akase .................................... | 73/117.3 |
| 5,373,732 | 12/1994 | Kuroda et al. ......................... | 73/117.3 |

FOREIGN PATENT DOCUMENTS

| | | |
|---|---|---|
| 42 28 677 A1 | 3/1993 | Germany . |
| 1-30098 | 6/1989 | Japan . |
| 2-112646 | 4/1990 | Japan . |
| 4-209950 | 4/1992 | Japan . |
| 4-203252 | 7/1992 | Japan . |
| 4-295161 | 10/1992 | Japan . |
| 2 256 491 | 12/1992 | United Kingdom . |

*Primary Examiner*—George Dombroske
*Attorney, Agent, or Firm*—Evenson, McKeown, Edwards & Lenahan, PLLC

[57] ABSTRACT

A prescribed threshold level Dth for misfire judgment for each cylinder is recorded in a misfire judgment level retaining means 102 of a misfire judgment processing section 100. A combustion state parameter operation means 106 measures revolution speed of a multi-cylinder engine for each cylinder, and attains as a combustion state parameter a differential in revolution speed between a specific cylinder and other cylinders. In a misfire judgment level correction means 104, a plurality of combustion state parameters concerning the specific cylinder is attained, and the above-mentioned threshold level Dth is corrected as a function of the parameter. A misfire judgment processing means 108 compares the combustion state parameter with the threshold level Dth and diagnoses a combustion state in the specific cylinder. Namely, the corresponding cylinder is judged to be misfire when the combustion state parameter of the specific cylinder exceeds the prescribed parameter.

13 Claims, 14 Drawing Sheets

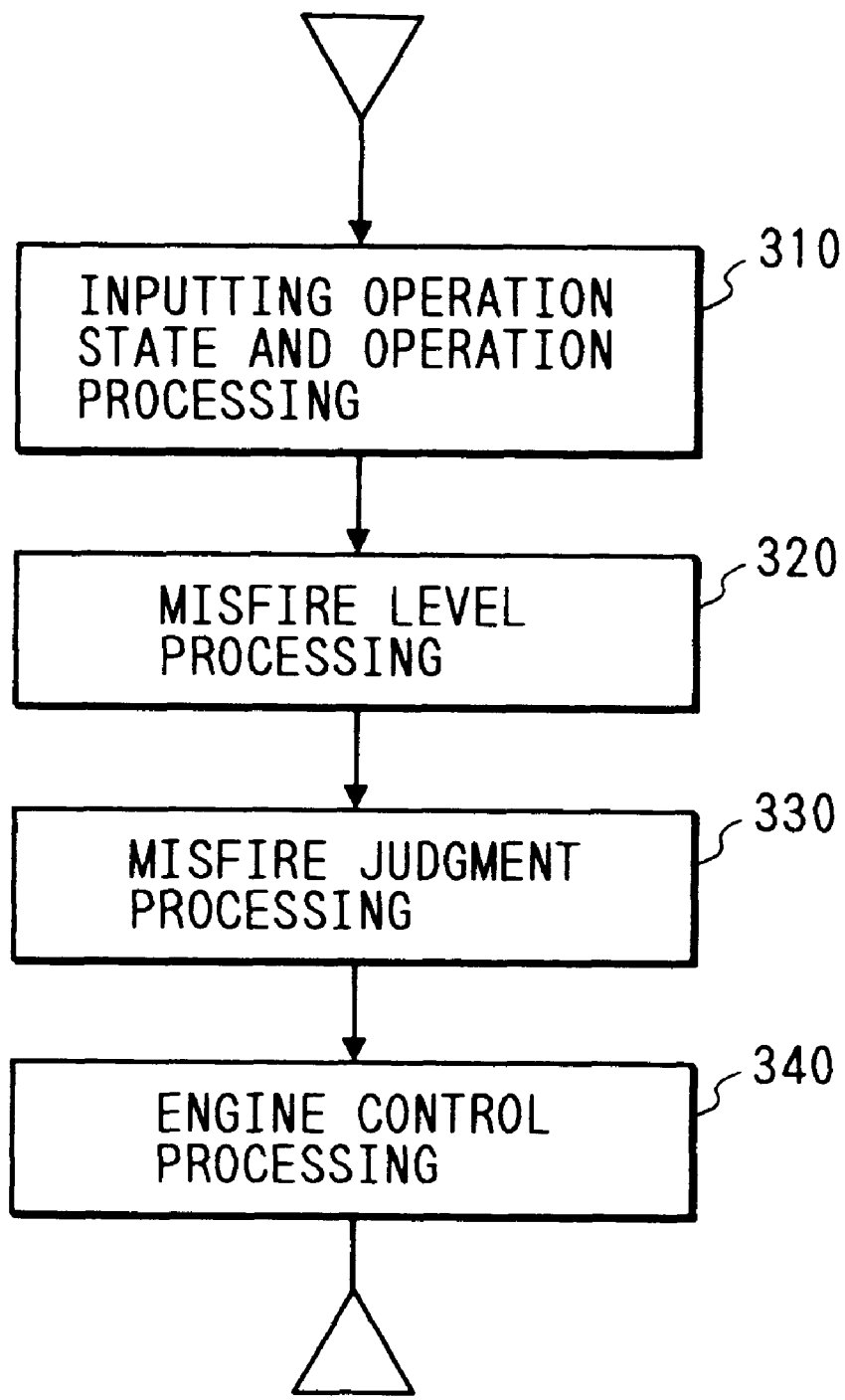

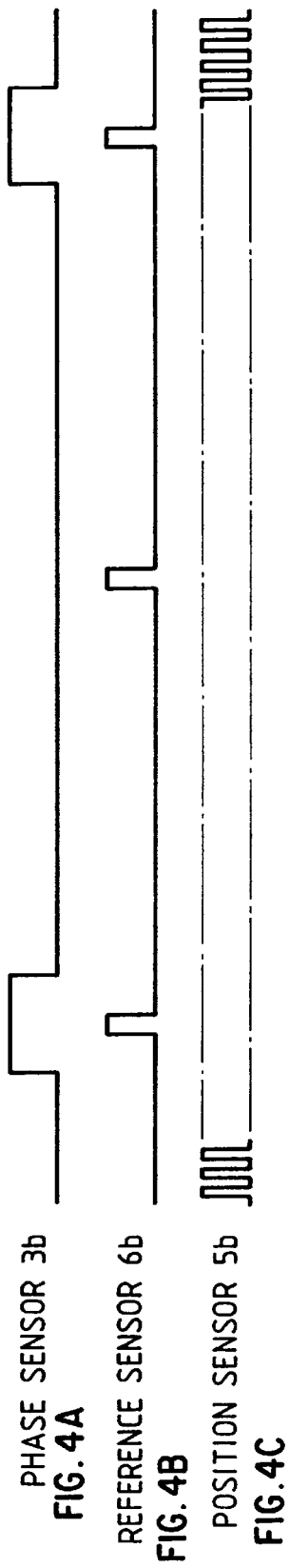
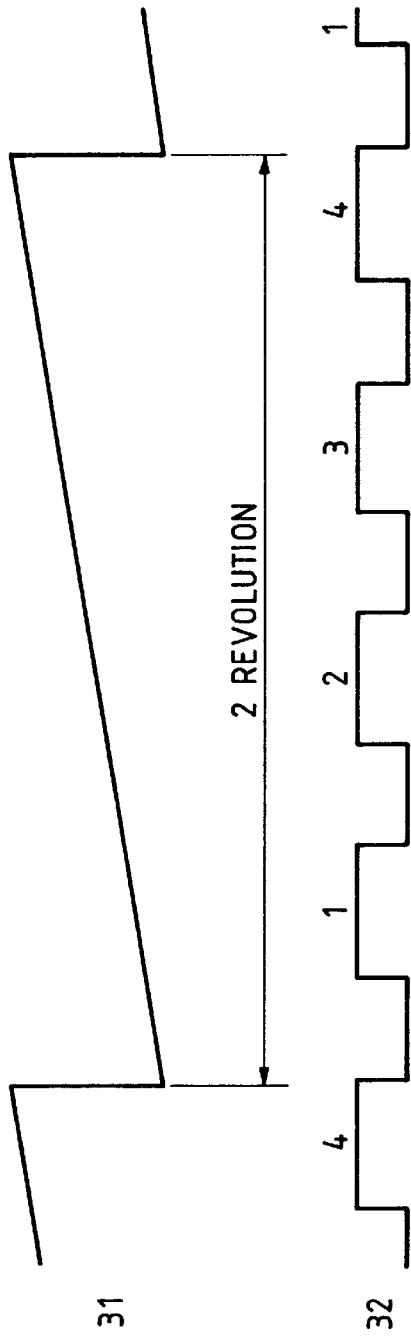
PHASE SENSOR 3b
FIG. 4A
REFERENCE SENSOR 6b
FIG. 4B
POSITION SENSOR 5b
FIG. 4C
COUNT VALUE 31
FIG. 4D
FIG. 4E

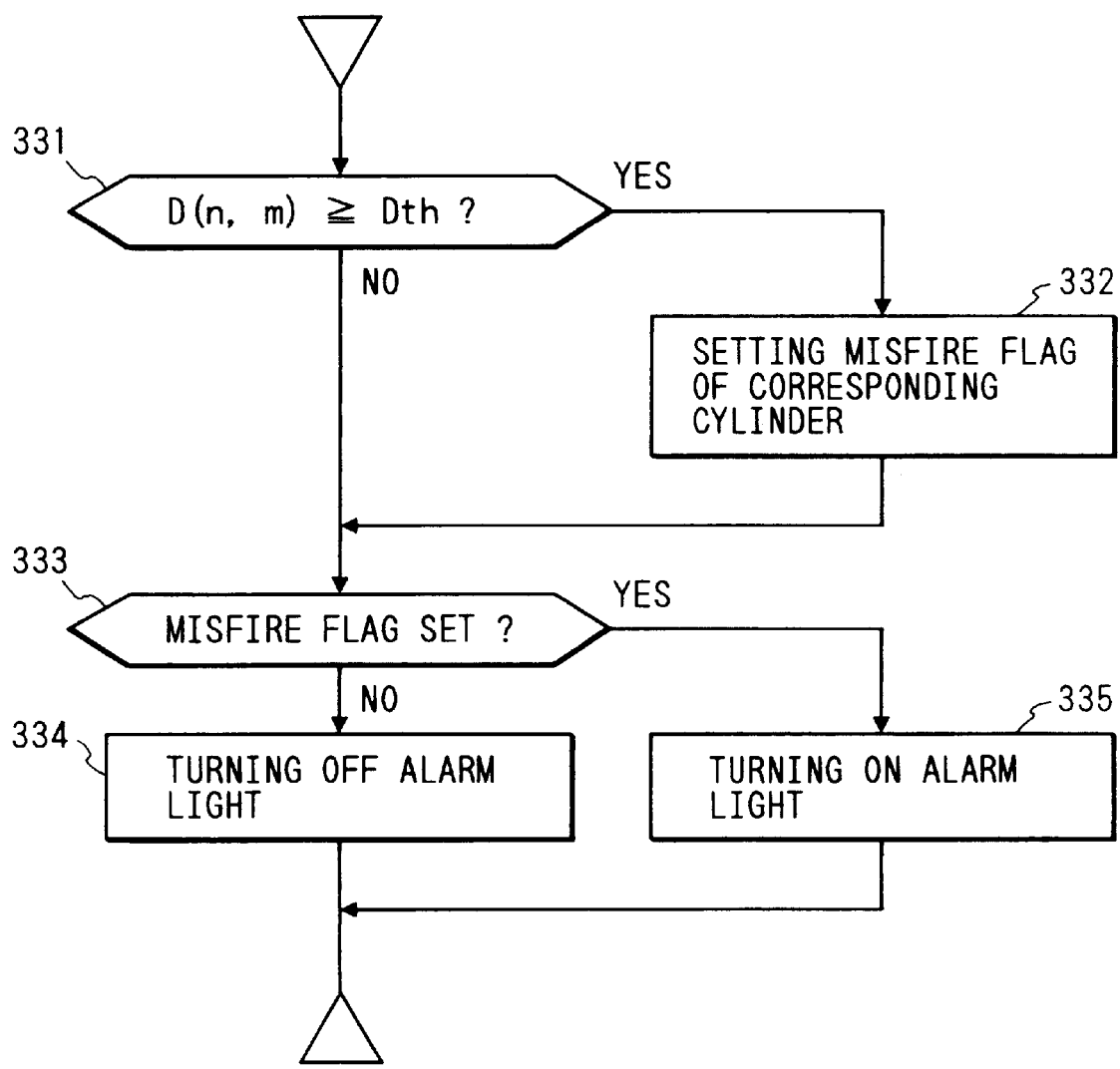

6,061,624

MULTI-CYLINDER ENGINE COMBUSTION STATE DIAGNOSIS APPARATUS AND METHOD

BACKGROUND OF THE INVENTION

The present invention relates to apparatus for and method of diagnosing a combustion state of multi-cylinder engine with a change of revolution speed among the cylinders.

Abnormality of combustion in the engine such as occurrence of misfire results in atmosphere contamination because of exhausting unburnt gases. Further, in catalyzer, etc. provided to purify the exhaust gas, when the unburnt gas burns, an exhaust purifying apparatus section thereof is heated to an abnormally high temperature, and its performance is degraded. For preventing this, it was necessary to detect misfire occurrence to send an driver an alarm, and to stop fuel supply to a cylinder in which misfire was occurring.

There are many prior arts concerning diagnosis apparatus of a combustion state such as misfire. Some examples of them are a method of detecting it with change in revolution speed of the engine, a method of detecting it using combustion pressure, temperature, etc. in a combustion chamber, a method of detecting a combustion state using a change in revolution speed among the cylinders, etc. Of the various methods, the method of detecting abnormality of combustion state, using a change in revolution speed has a characteristic that the combustion state can be detected with a relatively small cost increase and irrespective of their causes (even if deterioration in combustion state is caused by abnormality in any of fuel line, ignition line and air line). This method, as is disclosed in JP A 2-112646 and JP A 1-30098, detects revolution speed at a particular crank angle for each cylinder since the rotational speed differs between normal combustion and abnormal combustion, and diagnoses the combustion state on the basis of a change in the revolution speed among the cylinders.

Further, in order to remove a change in revolution speed due to outer disturbance factors such as a rough road other than engine misfire, a method of discriminating a specific operation state in which it is predictable that many such outer disturbances are inputted, on the basis of information of a remaining fuel amount, a brake switch, automobile speed, etc., and not executing misfire detection processing during such a specific operation period is disclosed in JP A 4-203252. Further, a method of using information of each wheel speed, detecting whether or not there is outer disturbance input on the basis of signals from an acceleration meter mounted on a car body, and stopping misfire judgment is disclosed in JP A 4-209950, JP A 4-295161, etc.

However, stopping all the misfire judgment at the above-mentioned specific operation detracts from preciseness in the misfire judgment. For example, even at a time of high speed rotation, at an operation of the brake switch, it is necessary that normal combustion and misfire can be judged correctly. Further, the above-mentioned method using wheel speed sensor information is necessary to mount revolution speed detection sensor on each wheel, and it was difficult to make a correlation between wheel speed change level and engine revolution change occurrence. On the other hand, in a method of stopping misfire judgment by detecting vibrations caused on the car body on a rough road by an acceleration sensor, such an acceleration sensor must be provided, it is difficult to make a correlation between engine revolution change starting and acceleration, and it takes much time to set the control data.

SUMMARY OF THE INVENTION

An object of the invention is to provide an apparatus for and a method of detecting engine combustion state, each of which apparatus and method is able to detect precisely the engine combustion state over a wide operational range under any engine operation conditions.

Another object of the invention is to provide engine combustion state detection apparatus and method, each of which can detect precisely misfire without using any special sensors.

The present invention, which diagnoses by measuring revolution speed of a multi-cylinder engine for each cylinder, obtaining differential between a revolution speed in a specific cylinder and a revolution speed in other cylinders as combustion state parameter, and comparing the combustion parameter with a prescribed threshold level, is characterized by obtaining a plurality of the above-mentioned combustion state parameters corresponding to the prescribed number of times of ignition including ignition of the above-mentioned specific cylinder, and correcting a value of the above-mentioned threshold level as a function of the plurality of combustion state parameters.

First of all, a plurality of the above-mentioned combustion state parameters corresponding to the prescribed number of times of ignition are obtained. The prescribed number of times of ignition means the prescribed number of times of ignition including ignition in a specific cylinder which is subjected to judgment of misfire. As an example, combustion state parameters, of the number of integer times as many as the number of cylinders, corresponding to ignition in each cylinder of the multi-cylinder engine are obtained continuously. Next, as a function of the plurality of combustion state parameters, for example according to an average, the value of the above-mentioned threshold level is corrected. And the corresponding cylinder is judged to misfire when the combustion state parameter of the specific cylinder becomes more than the prescribed threshold level.

BRIEF DESCRIPTION OF THE DRAWINGS

FIG. 3 is a main flow chart of processing in a misfire judgment processing section of FIG. 1;

FIG. 4 is timing chart of various signals of the embodiment in FIG. 1;

FIG. 7($b$) is an enlarged graph of a part of FIG. 7($a$);

FIG. 10 is a flow chart showing details of the misfire judgment processing in FIG. 3;

DESCRIPTION OF EMBODIMENT OF THE INVENTION

Figure 1:
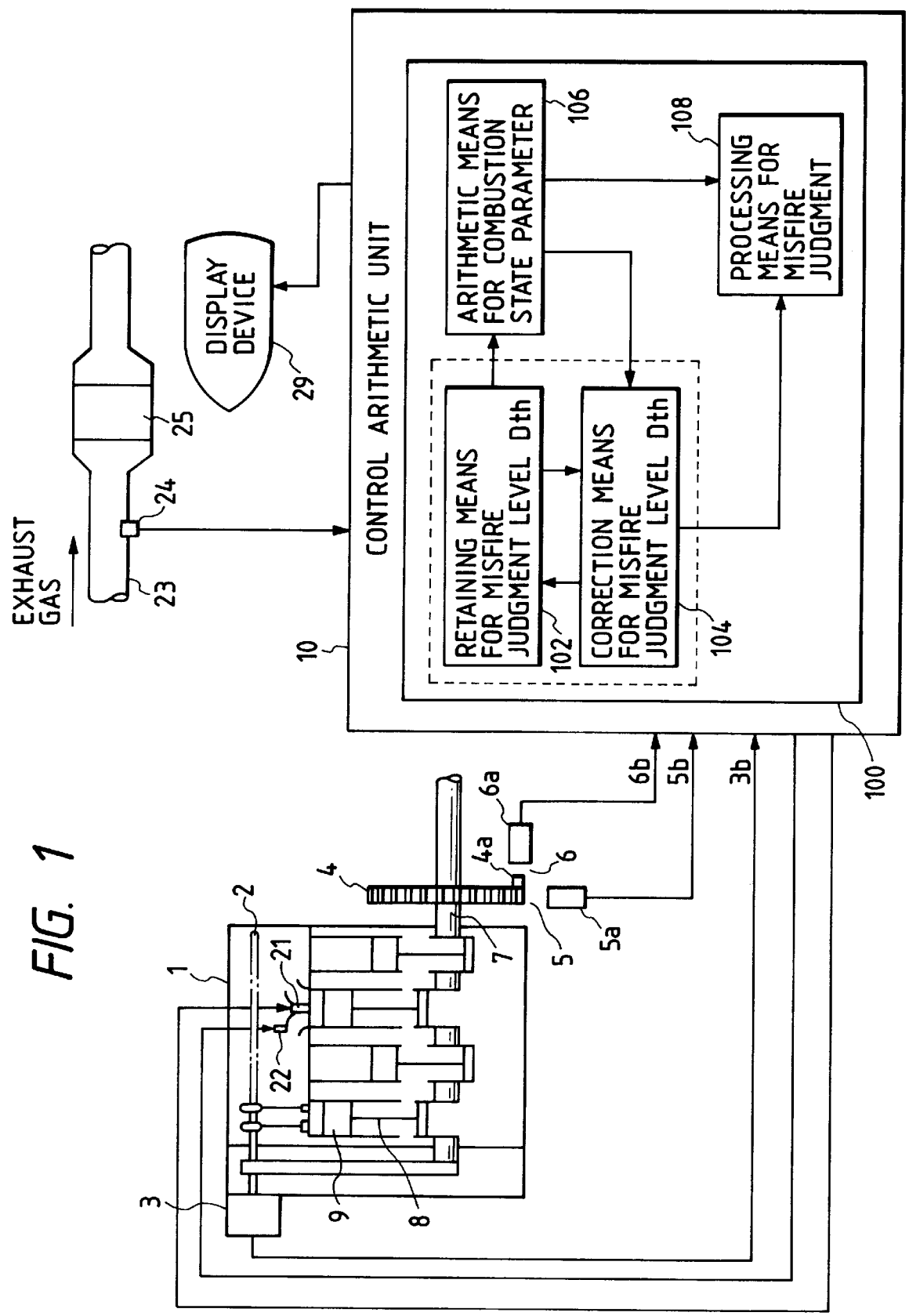
FIG. 1 is a schematic diagram of an embodiment of an overall construction of an engine controller according to the present invention.

An embodiment of the present invention is explained hereunder referring to the drawings.

FIG. 1 is a diagram showing a whole construction around a multi-cylinder engine of an embodiment of the present invention. An engine 1 is provided with a phase sensor 3 generating a signal once per two revolutions of a crank shaft 7 for cylinder discrimination, and a position sensor 5 of type in which a tooth shape of a ring gear 4 for a starter used at starting of the engine is detected by an electromagnetic type pickup 5a, that is, a sensor which generates signals of the number corresponding to the number of teeth of the ring gear 4, per one revolution of the crank shaft 7. A projection portion 4a mounted on the ring gear 4 for obtaining a signal at a fixed crank angle position once in one revolution of the crank shaft 7 and a reference sensor 6 which uses an electromagnetic type pickup 6a also are provided.

Outputs 3b, 5b, 6b from the various sensors 3, 5, 6 are inputted into a control arithmetic unit 10, wherein crank angle, revolution speed, etc. are calculated. Exhaust gas enters an exhaust pipe 23, and is purified by a catalyzer 25 provided therein after oxygen concentration is measured by an oxygen concentration sensor 24. In case that the engine 1 misfires, when unburnt gas flows out into the exhaust pipe 23 from the engine 1 and it is burnt at a position at which the catalyzer 25 is disposed, the position is heated to unusually high temperature to degrade the catalyzer 25, so that various kinds of harmful gases can not become purified and atmosphere is contaminated.

A misfire judgment processing section 100 detects an engine misfire state or condition, executes promptly necessary processing, and prevents occurrence of atmosphere contamination before the occurrence. The misfire judgment processing section 100 comprises a misfire judgment level retaining means 102, a misfire judgment level correction means 104, a combustion state parameter arithmetic operation means 106 and a misfire judgment processing means 108.

Figure 2:
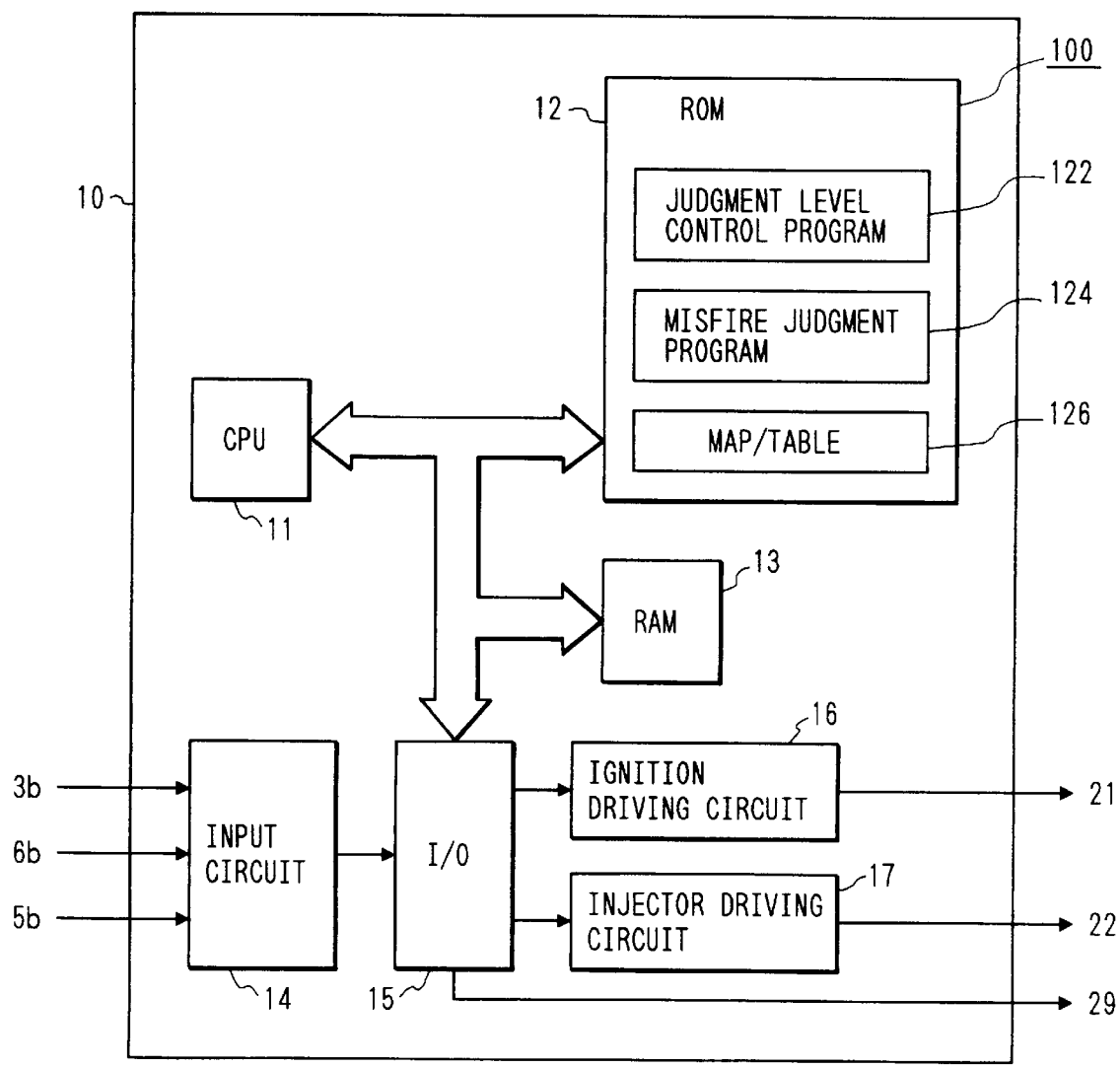
FIG. 2 is a block diagram of a circuit of control arithmetic unit of FIG. 1.

As shown in FIG. 2, the control arithmetic operation unit 10 is provided with an input circuit 14 inputting outputs 3b, 5b, 6b from various sensors 3, 5, 6, etc., an I/O 15, a ROM 12, a RAM 13 in which various data are memorized, and a CPU 11 which effects various operations on the basis of output signals 3b, 5b, 6b from various sensors 3, 5, 6, etc. and programs stored in the ROM 12. Further, it is provided with an ignition drive circuit 16 controlling an ignition plug 21 according to an instruction from the CPU 11, and an injector drive circuit 17 driving an injector 22 according to an instruction from the CPU 11. ROM 12 is provided with a judgment level control program 122 constituting each means 102 to 108 of the misfire judgment processing section 100 in FIG. 1, a misfire judgment program 124, and map and table 126.

Further, in FIG. 1, outputs from an air flow sensor(not shown), a water temperature sensor (not shown) are inputted into the control arithmetic operation unit 10. Signals from the control arithmetic operation unit 10 is inputted into a display device 29 for displaying to a driver diagnosis results, etc. such as combustion abnormality of the ignition plug 21, the injector 22, etc.

FIG. 3 shows a main flow of processing in the misfire judgment processing section 100. First of all, information of operation conditions of a vehicle is taken in (or inputted) to execute an arithmetic operation necessary for discriminating a normal condition and unusual condition such as abnormal road running (step 310). Next, control of misfire judgment level Dth according to the operation conditions is carried out by the misfire judgment level control program (320). Further, misfire judgment is effected on the basis of comparison between combustion state parameters D and the misfire judgment level Dth (330). Finally, correction of engine control is effected on the basis of the result of misfire judgment results, if necessary (340).

Next, an operation of the control arithmetic operation unit 10 including taking in of the operation conditions in step 310 and an operation processing to be taken after then is explained using FIGS. 4 to 7(b).

FIG. 4 is a diagram showing output timing from the various sensors 3, 5, 6 in case of a four cylinder engine. 3b represents an output of the phase sensor 3 after passing a waveform shaping circuit, the output is put out once every two revolutions of the crank shaft 7. The output timing is taken so as to put out the output at the combustion top dead center of a first cylinder. 6b represents an output of the reference sensor 6 after passing the waveform shaping circuit, the output is outputted once every one revolution of the crank shaft 7. Timing of the output is taken so as to output the output at the top dead center of the first cylinder.

5b represents an output of the position sensor 5 after passing the waveform shaping circuit, the output is outputted every a constant crank angle corresponding to each tooth of the ring gear 4. Waveform 31 expresses count value of the number of pulses of signal 5b, and it is reset by an AND signal of the signal 3b and the signal 6b. By this count value 31, crank angles that the combustion top dead center is taken as a reference, for example, can be detected. Waveform 32 is an example of a signal representing revolution speed measuring sections, the signal is set at a crank angle corresponding to a combustion stroke of each cylinder, based on the count value 31.

In the example of FIG. 4, an ignition order is first, second, third, fourth cylinder, and the revolution speed measuring sections are numbered corresponding to the cylinders. A time required for revolution for the revolution speed measuring section is measured by a clock in the CPU 11, which time is named as Tdata(n) (n: cylinder number).

Further, as a method of measuring the Tdata(n), it is possible to measure it by not resetting every two revolutions, but resetting count value 31 corresponding to the above-mentioned count value at the reference crank angle which is set for each cylinder.

Figure 5:
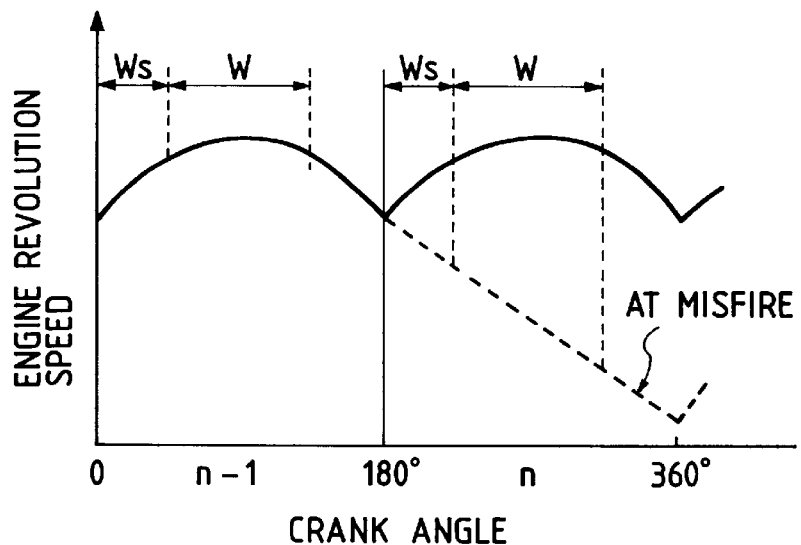
FIG. 5 is graphs showing a change in revolution speed.
Figure 6:
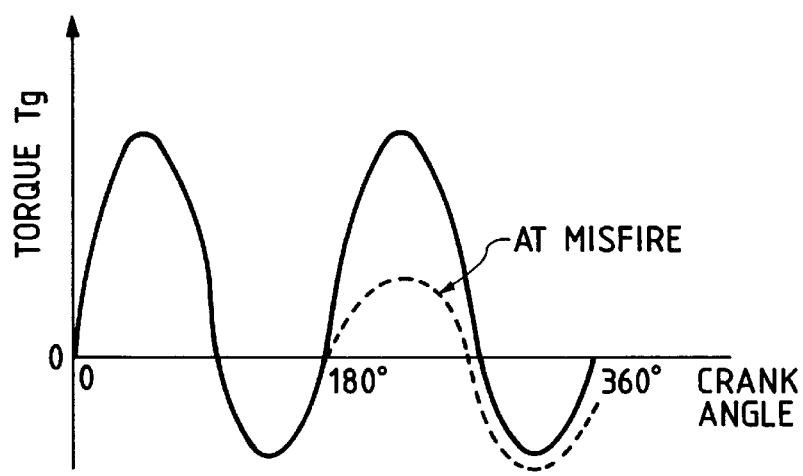
FIG. 6 is a graph showing a change in torque.

By the way, engine revolution speed N is not constant even in normal combustion condition, but it changes according to crank angle. The change is due to a change in torque Tg generated by air intake, compression, combustion, exhaust strokes, and a change in torque Ti caused by inertia of reciprocating mass such as pistons. For example, in a four cylinder engine, the torque Tg pulsates as shown in FIG. 6. This is a curve determined by product of pressure in the combustion chamber and arm length of the crank mechanism. According to the change in the generation torque Tg, at a time of low revolution speed in which the torque Ti is relatively small, for example, revolution speed N changes as shown in FIG. 5. In this case, when the engine misfires, the generated torque Tg and the revolution speed N are lowered as shown by a broken line in FIG. 5 since torque by explosion is not generated. Here, as a combustion state parameter, D' is adapted expressed by the following equation (1), for example;

$$D' = \{N(n)^2 - N(n-1)^2\}/2 \quad \ldots \quad (1)$$

in which N(n) is revolution speed of a corresponding cylinder. The combustion state parameter D' is a value nearly proportional to a change in rotational energy. Further, the revolution speed N is obtained by using the following equation (2), taking Ws (not necessary to be plus value) as a starting position of the revolution speed measuring section from the combustion top dead center of each cylinder and W (deg) as its width, and a measuring time Tdata(s) required for revolution for the revolution speed measuring section;

$$N = 60 \times (W/360)/Tdata \; (r/min) \quad \ldots \quad (2)$$

The equation (1) of the combustion parameter D' can be modified by using the equation (2) as follows:

$$D' \fallingdotseq \{N(n) - N(n-1)\} \cdot N(n-1)/2$$
$$= K \cdot W^2 \cdot \{Tdata(n-1) - Tdata(n)\}/$$
$$\{Tdata(n) \cdot Tdata(n-1)^2\}$$
$$(K = (60/360)^2) \fallingdotseq -K \cdot W^2 \cdot [\{Tdata(n) - Tdata(n-1)\}/$$
$$Tdata(n-1)^3]$$

Here, in order to simplify the combustion state parameter, $-K \cdot W^2$ is omitted.

$$D = \{Tdata(n) - Tdata(n-1)\}/Tdata(n-1)^3 \cdots \quad (3)$$

A case, in which the combustion state parameter D expressed by the equation (3) is used, is explained hereunder.

In this case, D represents a nearly zero value at a time of a normal condition and a plus value at a time of misfire. Further, in case the engine condition has not fallen into misfire as yet but incomplete combustion is effected, D represents a plus value corresponding to the degree. Further, a value of D at the time of misfire becomes larger as engine load increases.

Figure 7A:
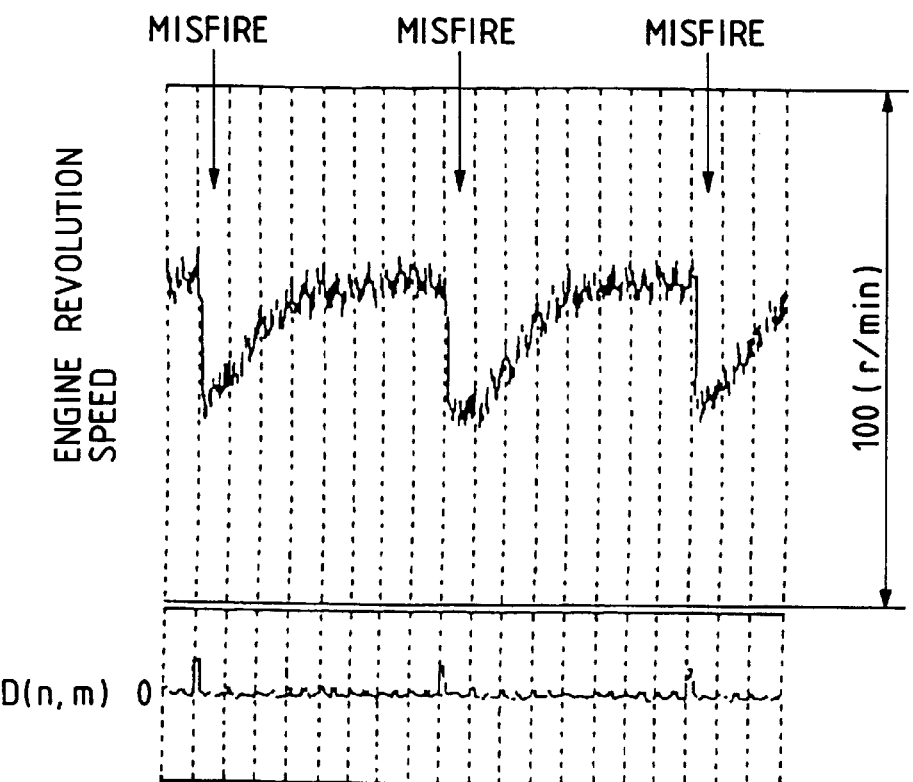
FIG. 7($a$) is graph showing a change in revolution speed N and combustion state parameters D (n, m) when misfire occurs.
Figure 7B:
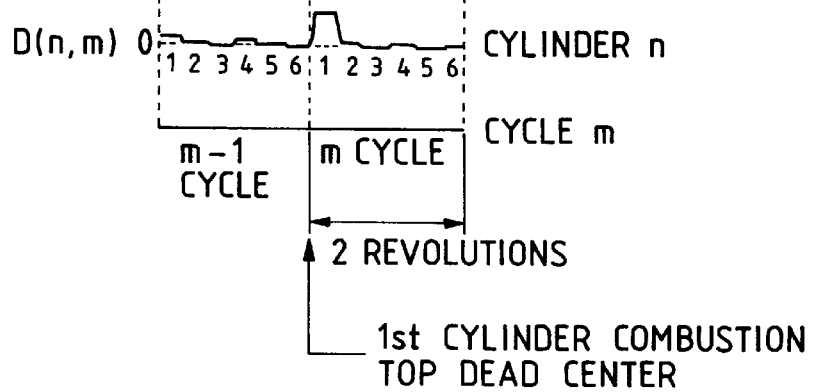

FIGS. 7(a) and 7(b) are graphs showing changes in engine revolution speed N and in combustion state parameter D in case that misfire in one cylinder is caused once each 48 times of ignition of a 6-cylinder engine (an ignition order is the 1st cylinder, 2nd cylinder, 3rd cylinder . . . 6th cylinder). It is noted that the combustion state parameter D changes corresponding to a misfire state.

Accordingly, it is possible by setting a plus value as a threshold for misfire for example to judge a corresponding cylinder to misfire when the combustion parameter exceeds the threshold value.

FIG. 7(b) is a part of a change in D of FIG. 7(a) which is enlarged. The combustion state parameter D changes corresponding to only the cylinder in which misfire occurred, namely, it is noted from FIG. 7(b) that it is possible to discriminate the cylinder in which misfire occurred from others. (In fact, there are time delays required for measuring Tdata and calculation of D, in this Fig. they are shown with their phases being matched.)

Figure 8:
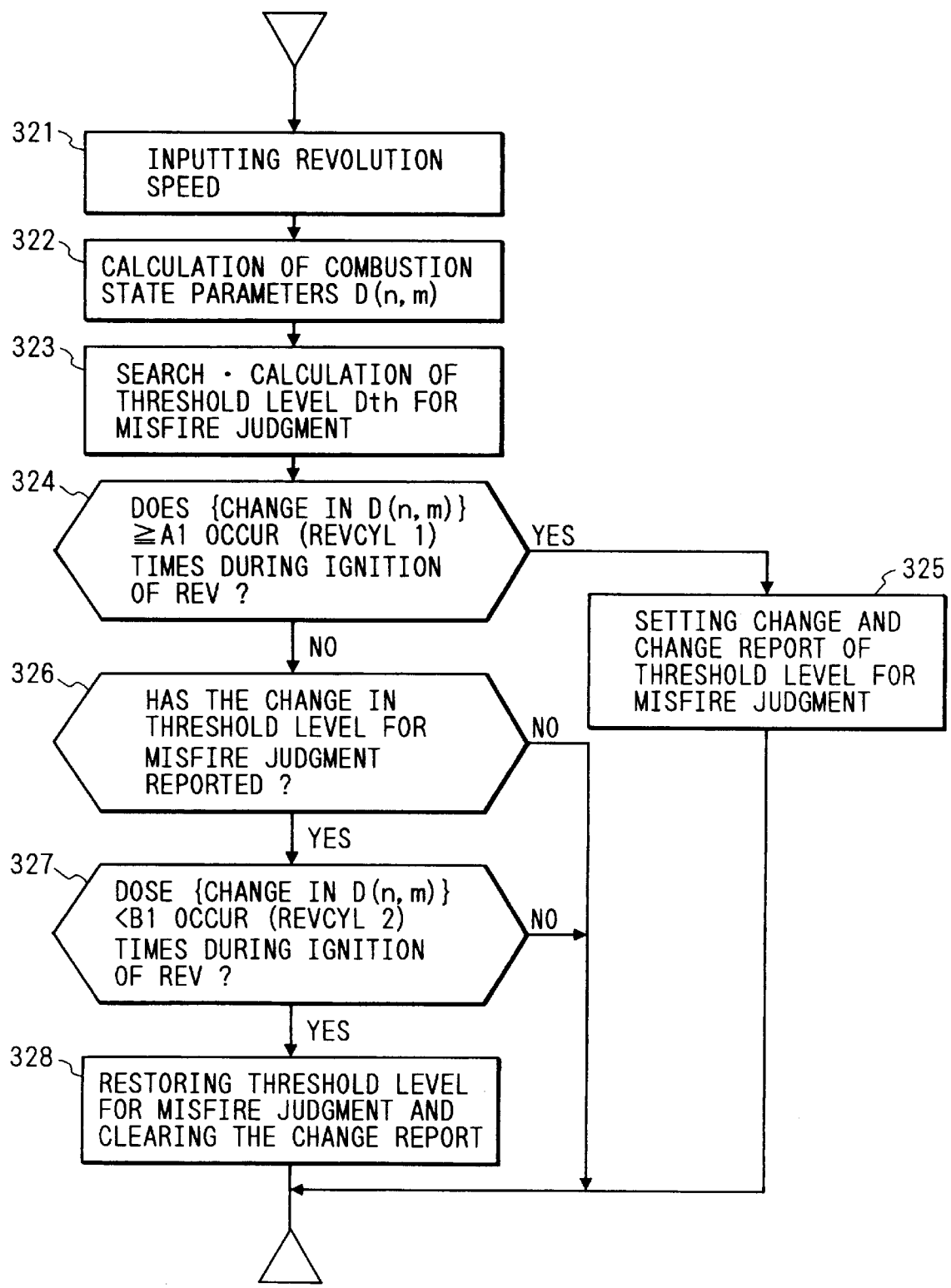
FIG. 8 is a flow chart showing details of an embodiment of misfire judgment level processing in FIG. 3.

Next, FIG. 8 shows details of the misfire judgment level control processing 320. First of all, engine revolution speed is taken in in step 321. Next, the combustion state parameter D (n, m) expressed by the equation (3) is calculated in step 322.

The combustion state parameter D (n, m) takes values as shown by D (n, m) in FIG. 7(b), considering an example of FIG. 7(b), for example, and assuming that n is cylinder no. (n is 1 to 6 in 6 cylinders and 1 to 4 in 4 cylinders), and m is the number of cycles.

Further, search and calculation of threshold level Dth for misfire judgment as shown in FIG. 9 are executed in step 323.

Next, it is judged whether or not the combustion state parameter D (n, m) is equal to a prescribed value A1 or more and the prescribed number of times of ignition (REV) occur continuously in step 324. Since there may be a case of lacking reliability such as error of detection of noise influence, it is desirable to monitor it for several cycles therebefore and thereafter to judge it. The prescribed number of times of ignition REV is set to 12 which is twice the number of cylinders in case of a 6-cylinder, for example.

In this manner, in step 324, it is judged whether or not the state in which a change in the combustion state parameter D(n, m) is equal to a prescribed value A1 or more occur prescribed times (REVCL1) during the prescribed number of times of ignition (REV). For example, the prescribed number of times (REVCYL1) is 6 times for the prescribed number of times of ignition (REV), and the judgment is shifted by one cylinder by one cylinder in turn for each cylinder and continuously processed.

And, when a change in the combustion state parameter D (n, m) exceeds the prescribed value A1 the prescribed number of times (REVCYL1), the threshold level Dth for misfire judgment is shifted from a level as shown by a solid line in FIG. 9 to a broken line in step 325. In step 325, the threshold level Dth for misfire judgment is taken as a value corresponding to an average of a prescribed value (Dtho (N, L) corresponding to engine revolution N and a load L)+a combustion state parameter change (ΔD (n, m)) (before the prescribed number of times j of ignition (ignition times J, for example, j=12) including the corresponding cylinder. For example, the Dth is given by the following equation.

$$Dth = Dtho(N, L)n + f\left\{1/j \sum_{(i-11)}^{i} \Delta D(i, m)\right\} \times kco \quad (4)$$

in which ΔD (n, m) is a change value of combustion state parameter, and kco is a correction coefficient. The threshold level Dth for misfire judgment is sufficient to be a value corresponding to an average of the combustion state parameter D (n, m), or a value corresponding to a calculated value from the average.

In step 327, it is judged whether or not the state in which a change in the combustion state parameter is equal to a prescribed value B1 or less occurred the prescribed number of times (REVCYL2)(for example, 6 times) during prescribed ignition (REV).

B1≦A1

In step 328, the following prescribed value is set;

Dth=Dtho (N, L) n.

Figures 9A, 9B:
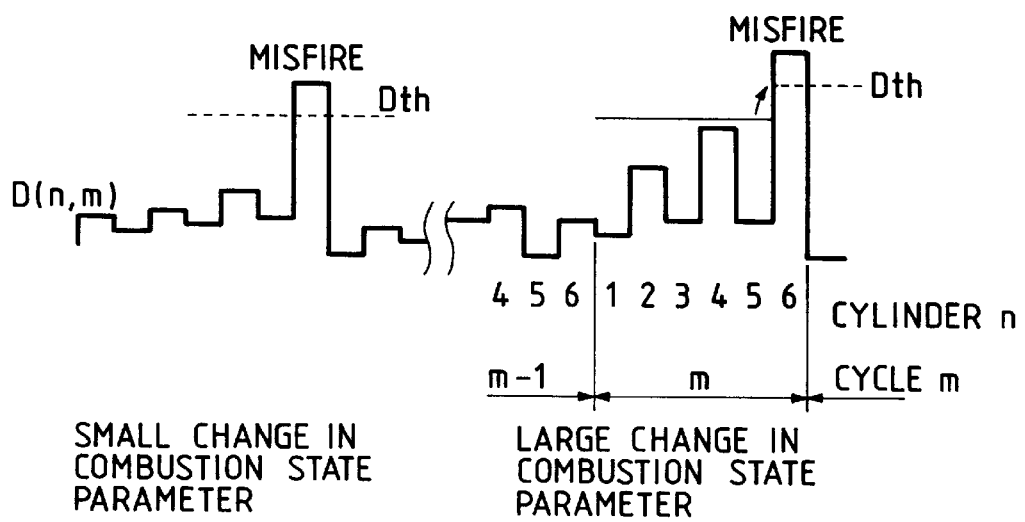
FIGS. 9($a$) and 9($b$) each is a diagram of explanation of threshold level Dth for misfire judgment in the processing in FIG. 8.

FIG. 9(a) shows a case in which a change in combustion state parameter D(n, m) is small, as in time of running on a flat road. FIG. 9(b) shows a case in which a change in combustion state parameter D(n, m) is large, as in time of running on a rough road. The combustion state parameter D(n, m) is compared with the threshold level Dth for misfire judgment for each cylinder, it is judged to misfire when the combustion state parameter D(n, m) is beyond the threshold level Dth. When a change in the combustion state parameter D(n, m) goes beyond the prescribed value A1 REVCYL1 times, it is judged to be a state of running on a rough road, the threshold level Dth for misfire judgment is changed from a level shown by a solid line to a level shown by a broken line.

Next, FIG. 10 shows the details of a misfire judgment processing of step 330. The combustion state parameter D(n, m) and the threshold level Dth are compared with each other as for which is larger in step 331, if the combustion state parameter D (n, m) is equal to Dth or more, it is judged to be in a misfire state and a misfire flag of the corresponding cylinder is set in step 332. In case where the misfire flag is set, an alarm light of a display device 29 is turned on in step 335. If the misfire flag is not set, the alarm light is turned off in step 334.

Figure 11:
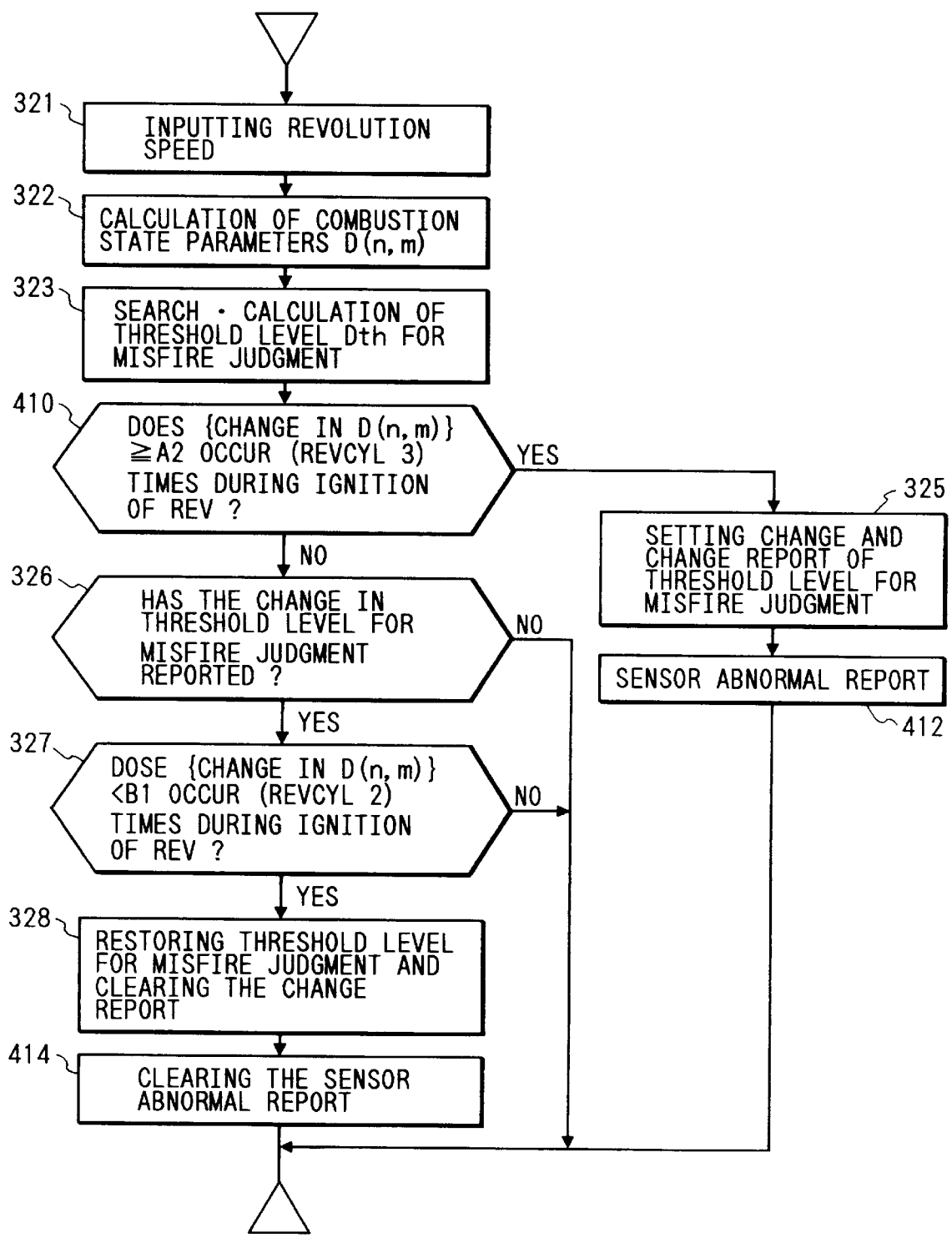
FIG. 11 is a flow chart showing details of another embodiment of misfire judgment level processing in FIG. 3.

Further, as a modification of the control processing 320 of the misfire judgment level in FIG. 8, the misfire judgment threshold level can be changed as follows as in FIG. 11. Namely, when a state in which a change in the combustion state parameter D(n, m) is too large (equal to A2 or more) occurred REVCYL3 times, a revolution sensor is assumed to be abnormal, a prescribed value C1 is added to the misfire judgment level Dth. In an example of FIG. 11, in step 410, the change value in D(n, m) is compared with a prescribed level value A2 which is higher than the level value A1, a state in which the change value is equal to A1 or more occurred REVCY3 times, the revolution sensor is judged to be abnormal, the process goes forward to step 325 in which a prescribed value C1 is added to a changing part of the misfire judgment threshold level as follows;

$$Dth = Dtho\ (N, L)n + C1\ (\text{prescribed value}) \ldots \quad (5)$$

In step 412, sensor abnormality is reported. (In a later processing, it can be used as information that misfire judgment is not executed, etc.)

The steps 326 and 327 are same in FIG. 8, and step 328 is processed as follows;
Dth=Dtho (N, L) n In step 414, the sensor abnormality report is cleared.

Figure 12:
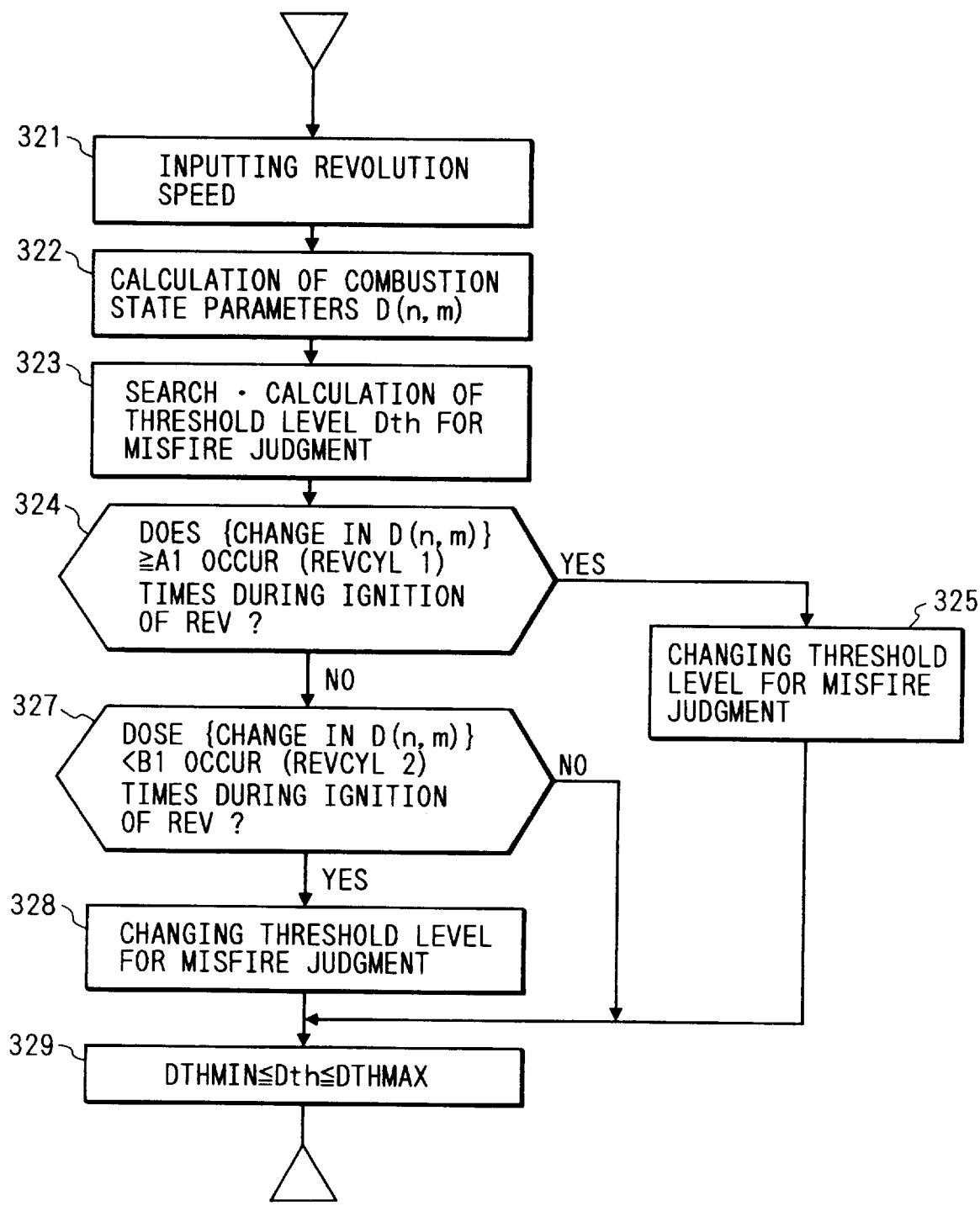
FIG. 12 is a flow chart showing details of another embodiment of misfire judgment level processing.

FIG. 12 shows another embodiment of the control processing 320 of the misfire judgment level Dth. In this embodiment, the misfire judgment threshold level in step 325 is made as follows, that is, a prescribed value C2 is added;

$$Dth\ n = Dtho\ (N, L)\ n\ Dth\ (m)n = Dth\ (m-1)\ n + C2 \ldots \quad (6)$$

In this case, in step 328 a prescribed value C3 is added.

$$Dth = Dtho\ (N, L)\ n\ Dth\ (m) = Dth\ (m-1)\ n - C3 \ldots \quad (7)$$

C2, C3 can be replaced by f(N, L) n.

In step 329, the threshold level for misfire judgment is limited to an upper limit value DTH MAX and to a lower limit value DTH MIN.

Figure 13:
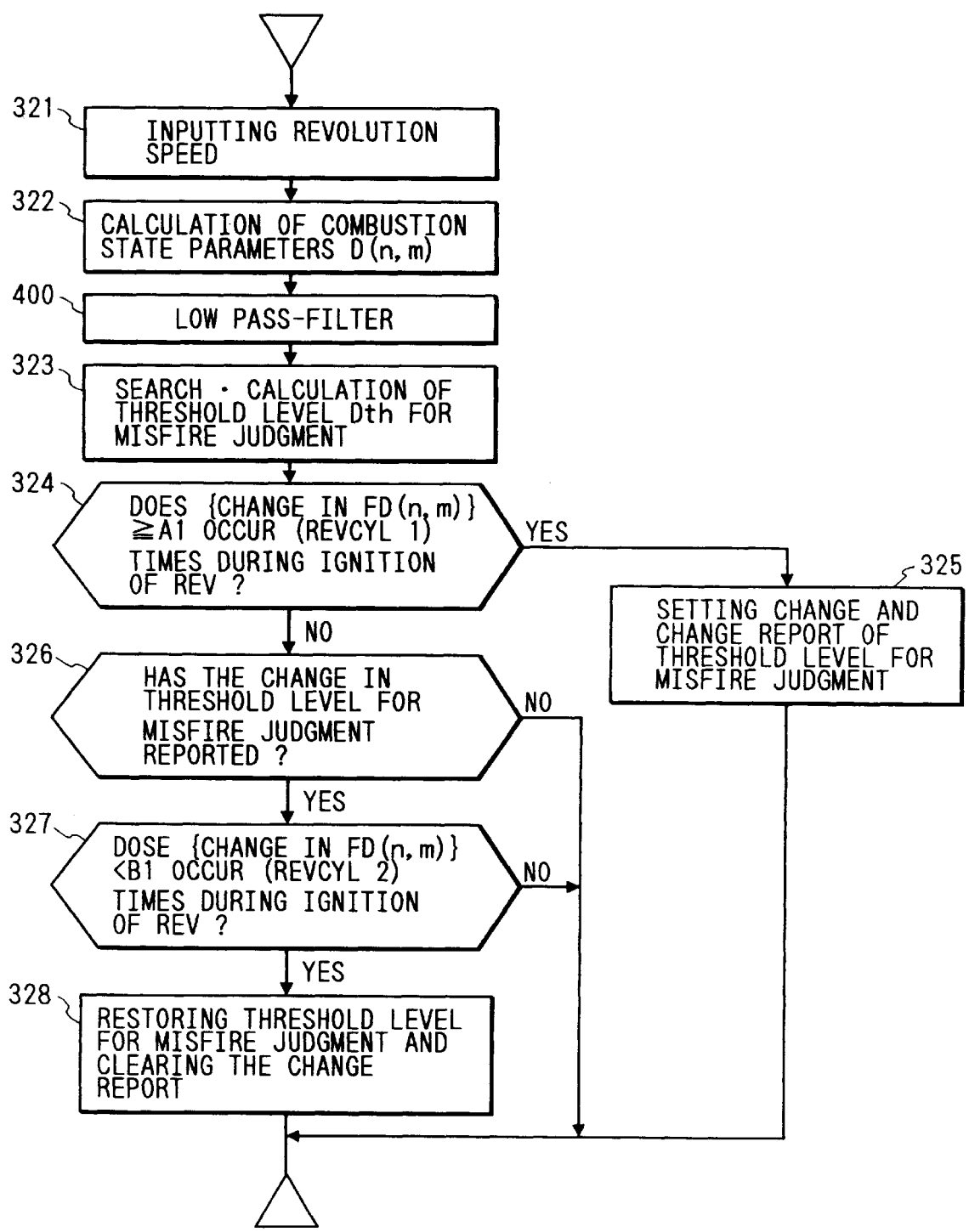
FIG. 13 is a flow chart showing details of another embodiment of misfire judgment level processing.

FIG. 13 shows another embodiment of the control processing 320 of the misfire judgment level Dth. A low-pass filter processing (step 400) is added between steps 322 and 323, and the processing in steps 323, 324, 325, 327 are changed as follows:

In step 400, the low-pass filter processing is executed on the combustion state parameter calculated in step 322 to obtain F(n, m).

FD (n, m) = α·D(n, m) + (1-α)·FD (n, m-1)
FD (n, m): combustion state parameter after passing the filter,
α: filter coefficient,
F (n, m) = FD (n, m) FD (n, m) > 0
F (n, m) = 0 FD (n, m) < 0

Figures 14A, 14B:
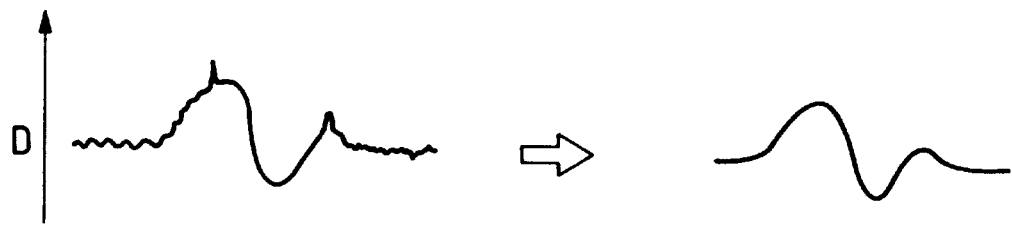
FIGS. 14a and b are an explanation diagram of a low-pass filter.

FIGS. 14(a) and 14(b) show an example of the low-pass filter processing, a signal of engine revolution speed taken in as in FIG. 14(a) is processed by the low-pass filter to output a signal as shown in FIG. 14(b).

In step 323, the threshold level for misfire judgment is given by the following equation;
Dth=Dtho (N, L) n In step 324, it is judged whether or not the state in which change in the combustion state parameter after passing the low-pass filter is equal to the prescribed value A1 or more occurred the prescribed number of times (REVCYL1, for example, 6 times). The judgment is continuously effected, with one cylinder by one cylinder being shifted in turn for each cylinder.

When a change of FD (n, m) after the combustion state parameter has passed the low-pass filter goes beyond the prescribed value A1 REVCYL1 times, as shown in FIG. 9, the threshold level Dth for misfire judgment is changed from a level by shown by a solid line to a level shown by a broken line in step 325. In step 325, the threshold level Dth for misfire judgment is given as a sum of a value depending on a change value (ΔFD (n, m)) of the combustion state parameter after passing the low-pass filter and a prescribed value, as in the following equation;

Dth=Dtho (N, L) n+f{ΔDF(n, m)}
ΔDF(n, m): a change value of combustion state parameter after passing the low-pass filter (wherein f{ΔDF(n, m)}≧0.)

In step 326, it is checked whether or not the threshold level for misfire judgment is renewed, in step 327 it is judged whether or not the state in which a change in the combustion state parameter after passing the low-pass filter is equal to the prescribed value B1 or less occurred prescribed times (PEVCYL1, for example, 6 times) during the prescribed number of times of ignition (REV).
B1≦A1

In step 328, the following prescribed value is set;
Dth=Dtho (N, L) n.

Figure 15:
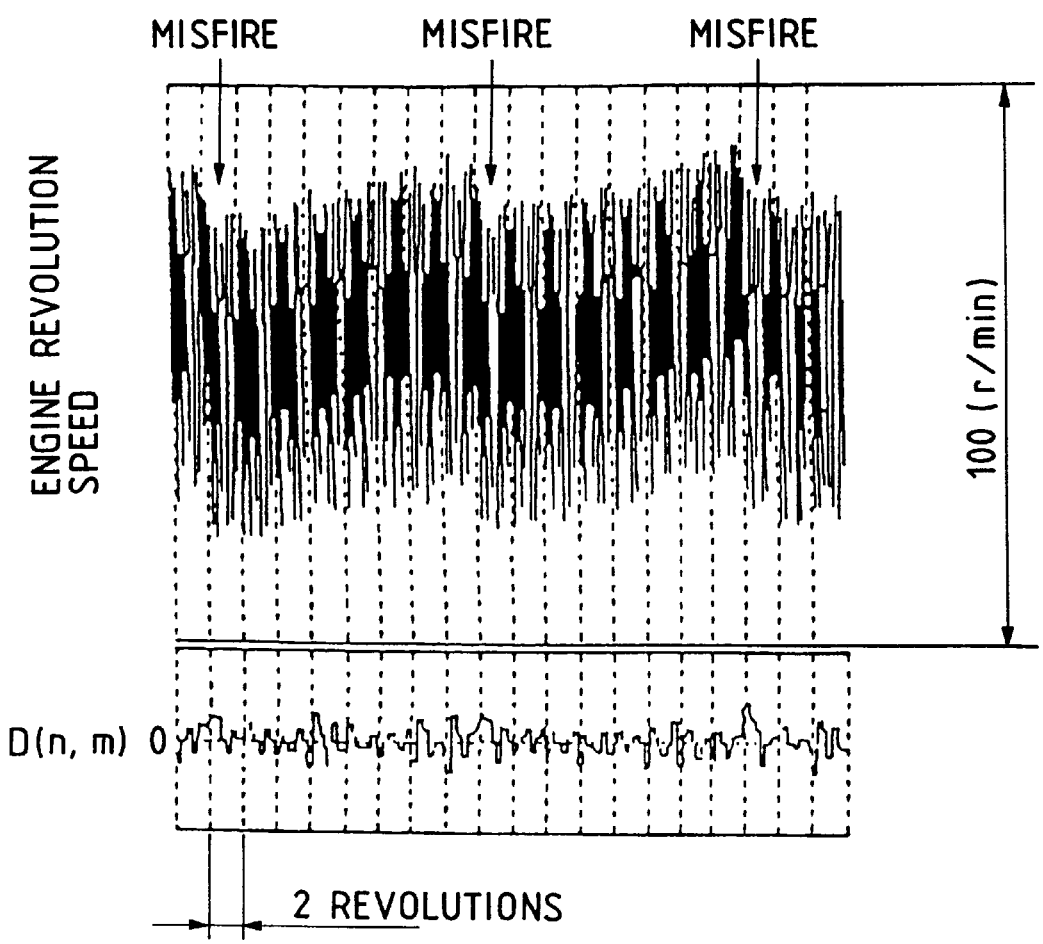
FIG. 15 is a graph showing change in engine revolution speed N and combustion state parameters D (n, m) at time of high engine revolution speed.

Next, FIG. 15 shows a state in which only engine average revolution speed is made high to a degree of about 6000 (r/min) and the other conditions are made the same as in FIG. 7. As compared with it at low revolution speed, it is noted that difference in the combustion state parameter between at a time of misfire and at a time of normal operation is not clear. Further, it is noted that a drop in revolution speed at the time of misfire is small (because a time required until the next combustion stroke of the cylinder in which misfire occurred is shortened), and a change in revolution speed within the stroke is large (because torque Ti caused by inertia force of reciprocating mass such as a piston increases, as previously mentioned).

In this manner, of the causes that the difference in combustion state parameter D between at a time of misfire and at time of normal operation becomes not clear, some of the causes which have a largest role are an error in width of the revolution speed measuring section, an error in mass of operating members such as the pistons, an error in length of connecting rods, etc.. Here, as for the error in the width W of the revolution speed measuring section, in case that misfire occurred at revolution speed of 6000 (r/min), considering that the revolution speed decreases by only 5 to 10 (r/min), an error in the width W of 1/1000×W or less a problem, for example. Therefore, in a mass-production process, it is difficult to retain all the revolution speed measuring section width with such precision (precision of teeth of the ring gear 4, et.).

Of those errors, the error in the mass of the operating member such as piston etc. becomes variation of change in torque Ti accompanied by the above-mentioned inertia force, finally, it becomes variation of change in revolution speed. However, it is difficult to discriminate simply it from variation of change in revolution speed due to change in combustion state. By the way, a change $\omega_c$ in revolution speed caused by change in torque Ti, as expressed in the equation (8), can be expressed as a product of revolution speed $\omega$ and a function $h(\theta)$ of crank angle $\theta$;

$$\omega_c \approx \theta \cdot h(\theta) \ldots \quad (8)$$

wherein $\omega_c$ is change in revolution speed due to inertia of a reciprocating part such as a piston;

$\omega$ is rotational speed (for example, an average revolution speed in ignition cycle);

$\omega$ is crank angle; and $h(\theta)$ is a function of crank angle $\theta$, is determined by mass of a reciprocating part such as a piston, length of the connecting rod, etc. (The details of $h(\theta)$ are described in Japanese patent application 2-42458 (JP A 3-246346, the corresponding U.S. Pat. No. 5,241,480).)

Therefore, variation $\omega_c'$ of change in revolution speed can be expressed by an equation (9), assuming that variation of $h(\theta)$ is $h'(\theta)$;

$$\omega_c' \approx \theta \cdot h'(\theta) \ldots \quad (9)$$

From the equation (9), it is noted that the variation of change in the revolution speed becomes larger as the revolution speed becomes higher.

On the other hand, assuming that an error in the revolution speed measuring width W is referred to as W', an error Tdata' in Tdata to be obtained can be expressed by the following equation (10), for example;

$$\text{Tdata}' = (W'/W) \times \text{Tdata} \ldots \quad (10)$$

From the equation (10), it is noted that the error Tdata' is proportional to Tdata, that is, it is in inverse proportion to revolution speed.

Further, studying variation of the combustion state parameter D, assuming that an error in revolution speed measuring section corresponding to the n-th cylinder is referred to as W' (n), and an error of D is D', when Tdata is constant, that is, the revolution speed is constant, the variation D' of the combustion state parameter can be expressed by the following equation (11) from the equations (3) and (10);

$$\begin{aligned} D'(n, m) &= \{Tdata'(n) - Tdata'(n-1)\}/Tdata'(n-1)^3 \\ &= [\{W'(n)/W \times Tdata(n) - \\ &\quad W'(n-1)/W \times Tdata(n-1)\}]/Tdata(n-1)^3 \\ &\approx [\{W'(n) - W'(n-1)\}/W]/Tdata(n-1)^2 \end{aligned} \quad (11)$$

From the equation (11), it is noted that since W'(n) or W'(n-1) is constant for each revolution speed measuring section, the variation D' of the combustion state parameter is in inverse proportion to $\text{Tdata}^2$, that is, it is in proportion to the second power of revolution speed.

By the above-mentioned study, influence that various error factors affect required time Tdata, that is, errors in Tdata can be expressed as a function of revolution speed by the equation (10). Further, influence that the various error factors affect the combustion state parameter, for example, D, that is, variation of D also can be expressed as a function of revolution speed by the equation (11).

Figure 16:
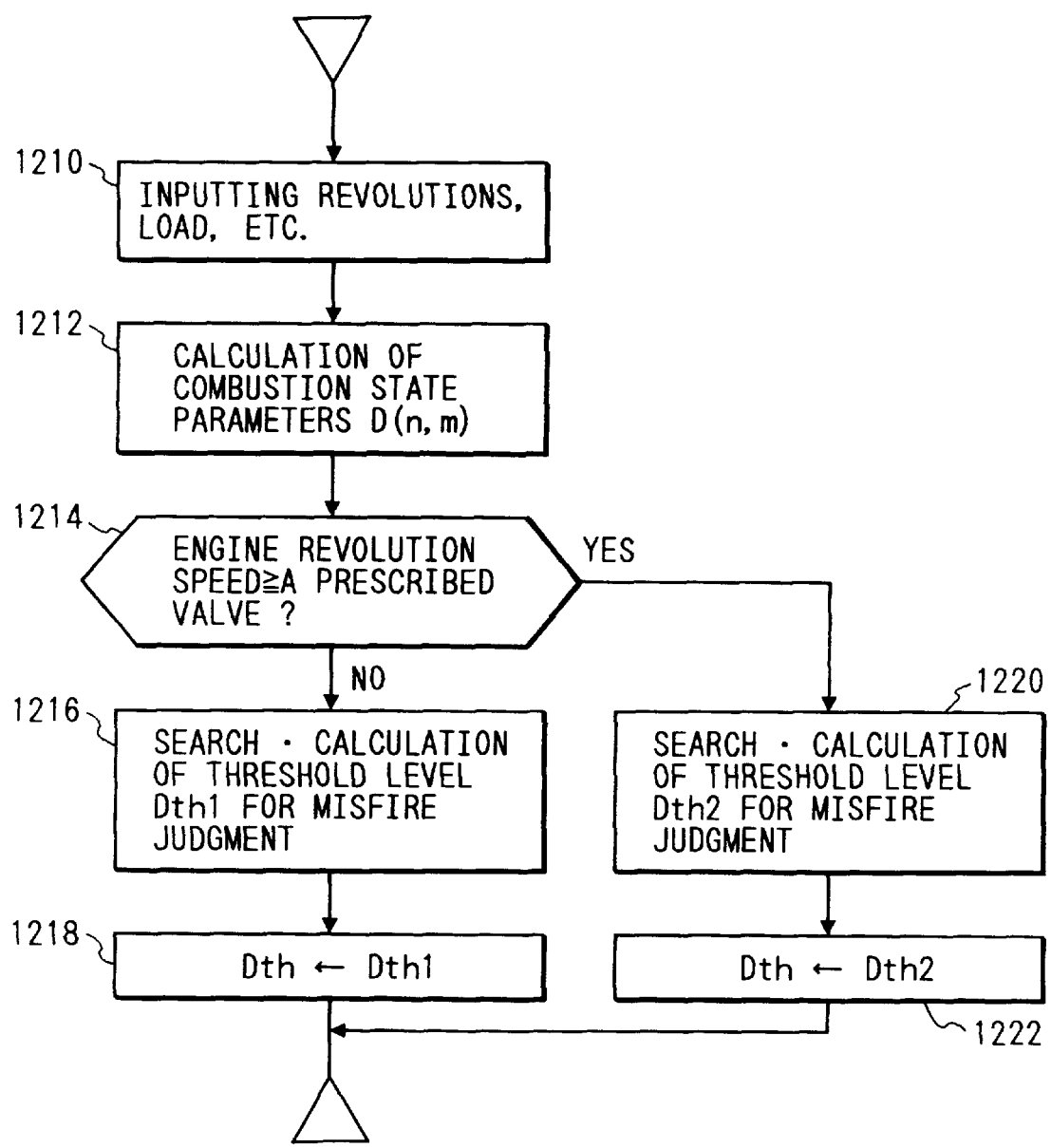
FIG. 16 is a flow chart showing details of another embodiment of misfire judgment level processing, corresponding to FIG. 15.

As another embodiment of the present invention, an example, in which the combustion state parameter at a time of high revolution speed as shown in FIG. 15 is taken into account, is shown in FIG. 16. First of all, information such as revolution speed, load, etc. are taken in in step 1210, then it is judged whether or not the engine revolution speed is more than a prescribed value in step 1214 after calculation of combustion state parameter D (n, m) in step 1212. Next, threshold level Dth for misfire judgment is calculated as follows, and misfire is judged using the threshold level Dth. Namely, according to combustion state parameters of a specific cylinder and a cylinder one cylinder before the specific cylinder in time of low revolution speed, and according to the same combustion state parameters of the same cylinder at a time of high revolution speed, a threshold level Dth for misfire are searched and calculated in steps 1216, 1220.

(a) When engine revolution speed<a prescribed value:

Dth1=Dth0 (N, L) n+f{D(n, m), D(n-1, m)} wherein N is the engine revolution speed;

L is load;

n is cylinder number.

(b) When the engine revolution speed≧a prescribed value:

Dth2=Dth0 (N, L) n+f{D(n, m), D(n, m-1)} Concretely, the equation is given as follows by rewriting the function part of the combustion state parameter;

In case of (a);

Dth1=Dth0 (N, L) n+f{D(n, m)+D(n-1, m)} K1

In case of (b);

Dth2=Dth0 (N, L) n+f{D(n, m)+D(n, m-1)} K2

Figure 17:
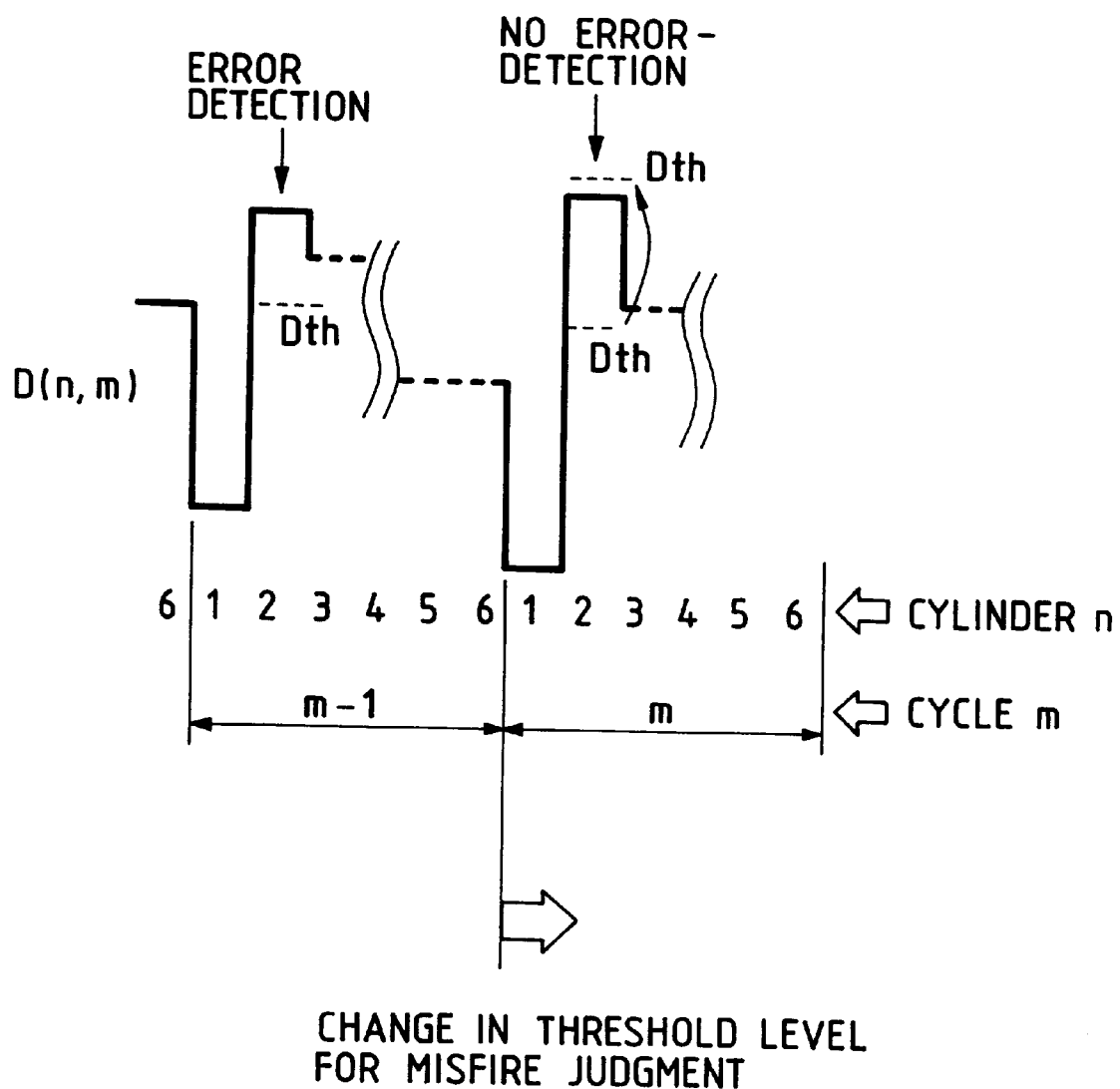
FIG. 17 is an explanation diagram of threshold level Dth for misfire judgment in the processing of FIG. 16.

As shown in FIG. 17, at a time of high revolution, on the same cylinder, for example, the second cylinder, combustion state parameter D (n, m) is calculated each cycle m-1, m, . . . , the threshold level Dth for misfire judgment is renewed. In the example of FIG. 17, a detection error occurs at a cycle m-1, however, a detection error does not occur at next cycle m because the threshold level Dth is renewed.

In this manner, according to the combustion state parameter in a time of low revolution, an arithmetic operation of the threshold level Dth for misfire judgment is executed, and the misfire judgment processing is executed on the basis of the result, whereby even in time of high revolution in which difference in the combustion state parameter D between at a time of misfire and in a normal operation becomes not clear, other than in the time of low revolution, engine misfire of the engine can be judged with high precision.

Further, the combustion state parameter D is not limited to the above-mentioned examples of the embodiments, parameter or parameter based on difference in revolution speed each cylinder can be used other than the parameter D. For example, the following equation (12) can be used in which D is replaced by Pk in the equation (3) described in Japanese Patent Application no. 2-509, page 14 (JPA 3-206342).

$$D\ n = N\ n\ 2 - (Nn1 + Nn3)/2 \ldots \quad (12)$$

According to the present invention, engine conditions can be diagnosed with high precision without specific sensor or sensors over a wide operation range, accordingly atmosphere contamination by exhaust gas can be decreased.

What is claimed is:

1. A combustion state diagnosis apparatus of a multi-cylinder engine for diagnosing combustion conditions in a specific cylinder from a plurality of cylinders by measuring revolution speed of the engine for each cylinder, obtaining, as a combustion state parameter, a difference between revolution speed of the specific cylinder and revolution speed of at least one of the other cylinders, and comparing the combustion state parameter with a prescribed threshold level which is a function of at least one of the engine revolution speed and engine load, comprising means for obtaining a plurality of combustion state parameters corresponding to a prescribed number of times of ignition including ignition in said specific cylinder; and means for correcting said threshold level based on changes in said plurality of combustion state parameters.

2. A combustion state diagnosis apparatus of a multi-cylinder engine according to claim 1, further comprising:

means for obtaining an average change in said plurality of combustion state parameters corresponding to the prescribed number of times of ignition including ignition in said specific cylinder;

means for correcting said threshold level according to said average change in said plurality of combustion sate parameters.

3. A combustion state diagnosis apparatus of a multi-cylinder engine according to claim 1, further comprising:

means for detecting if said plurality of combustion state parameters corresponding to the prescribed number of times of ignition being at least equal to a prescribed value occurs the prescribed number of times; and means for correcting said threshold level when said detecting means detects that said plurality of combustion state parameters has occurred said prescribed number of times.

4. A combustion state diagnosis apparatus of a multi-cylinder engine to measure revolution speed of the engine for each cylinder by obtaining, as a combustion sate parameter, a difference between revolution speed of a specific cylinder of a plurality of cylinders and revolution speed of at least one of the other cylinders, and diagnosing combustion conditions in the specific cylinder according to said combustion state parameter, comprising:

means for memorizing said combustion state parameters for each cylinder;

means for setting a prescribed value of threshold level for misfire judgment, said prescribed value being a function of at least one of the engine revolution speed and engine load;

means for correcting said threshold level on the basis of a state of said plurality of combustion state parameters corresponding to the prescribed number of times of ignition before ignition in the specific cylinder; and means for judging the combustion state in the corresponding cylinder to be a misfire when combustion state parameter of said specific cylinder exceeds a prescribed threshold level.

5. A combustion state diagnosis apparatus of a multi-cylinder engine according to claim 4, wherein said prescribed number of times is integer times the number of cylinders of the multi-cylinder engine.

6. A combustion state diagnosis apparatus of a multi-cylinder engine to diagnose combustion conditions in a specific cylinder of a plurality of cylinders by measuring revolution speed of the engine for each cylinder, obtaining, as a combustion state parameter, a difference between revolution speed of the specific cylinder and revolution speed of the other cylinders, and comparing the combustion state parameter with a prescribed threshold level which is a function of at least one of the engine revolution speed and engine load, comprising:

means for obtaining an average change in said plurality of combustion state parameters corresponding to the prescribed number of times of ignition before ignition in said specific cylinder; and means for correcting said threshold level between a prescribed maximum value and minimum value, according to said average change in said plurality of combustion state parameters.

7. A combustion state diagnosis apparatus of a multi-cylinder engine according to claim 6, wherein said prescribed number of times is integer times the number of cylinders of the multi-cylinder engine.

8. A combustion state diagnosis apparatus of a multi-cylinder engine according to claim 1, wherein said prescribed number of times is integer times the number of cylinders of the multi-cylinder engine.

9. A combustion state diagnosis apparatus of a multi-cylinder engine to diagnose combustion conditions in a specific cylinder of a plurality of cylinders by measuring revolution speed of the engine for each cylinder, by obtaining, as a combustion state parameter, a difference between revolution speed of the specific cylinder and revolution speed of at least one of the other cylinders, and comparing the combustion state parameter with a prescribed threshold level which is a function of at least one of the engine revolution speed and engine load, comprising:

means for correcting said threshold level according to the combustion state parameters of said specific cylinder and the cylinders other than said specific cylinder when the engine revolution speed is less than one value and for correcting said threshold level according to the combustion state parameter of the same cylinder when the engine revolution speed is at least equal to another value.

10. A multi-cylinder engine having a combustion state diagnosis apparatus to measure revolution speed of the multi-cylinder engine for each cylinder by obtaining, as a combustion state parameter, a difference between revolution speed of a specific cylinder and revolution speed of at least one of the other cylinders, and diagnosing combustion conditions in the specific cylinder according to said combustion state parameter and a threshold level which is a function of at least one of the engine revolution steed and engine load, comprising:

means for obtaining a plurality of combustion state parameters corresponding to the prescribed number of times of ignition before ignition in said specific cylinder; and means for correcting said threshold level as a function of said plurality of combustion state parameters.

11. A combustion state diagnosis method for a multi-cylinder engine to measure revolution speed of the engine for each cylinder comprising the steps of obtaining, as a combustion state parameter, a difference between revolution speed of a specific cylinder and revolution speed of at least one of the other cylinders, and diagnosing combustion conditions in the specific cylinder according to said combustion state parameter and a threshold level which is a function of at least one of the engine revolution speed and engine load:

obtaining a plurality of combustion state parameters corresponding to the prescribed number of times of ignition before ignition in said specific cylinder; and correcting said threshold value as a function of said plurality of combustion state parameters.

12. A combustion state diagnosis method for a multi-cylinder engine according to claim 11, wherein said threshold level is corrected when the change in said combustion state parameter is at least equal to a prescribed value occurs the prescribed number of times for said prescribed number of times of ignition.

13. A combustion state diagnosis method for a multi-cylinder engine to diagnose combustion conditions in a specific cylinder of a plurality of cylinders by measuring revolution speed of the engine for each cylinder, comprising the steps of obtaining, as a combustion state parameter, a difference between revolution speed of the specific cylinder and revolution speed of at least one of the other cylinders, comparing the combustion state parameter with a prescribed threshold level which is a function of at least one of the engine revolution speed and engine load, and correcting said threshold level according to the combustion state parameters of said specific cylinder and the cylinders other than said specific cylinder when the engine revolution speed is less than a prescribed value, and according to the combustion state parameter of same cylinder when the engine revolution speed is at least equal to the prescribed value.

* * * * *